United States Patent Office 3,290,311
Patented Dec. 6, 1966

3,290,311
DERIVATIVES OF 3,5-DIAMINO-6-CHLOROPYR-
AZINOIC ACID ESTERS AND A PROCESS FOR
MAKING THEM
Edward J. Cragoe, Jr., Lansdale, and James H. Jones, Blue
Bell, Pa., assignors to Merck & Co., Inc., Rahway, N.J.,
a corporation of New Jersey
No Drawing. Filed Mar. 31, 1964, Ser. No. 356,038
6 Claims. (Cl. 260—250)

This application is a continuation-in-part of Serial No. 311,291, filed September 27, 1963, which in turn is a continuation-in-part of Serial No. 234,213, filed October 30, 1962, now abandoned; and Serial No. 313,315, filed October 7, 1963, which in turn is a continuation-in-part of Serial No. 234,230, filed October 30, 1962, now abandoned.

This invention is concerned with a novel method for making a 3,5-diamino-6-chloropyrazinoic acid ester and the novel products prepared thereby.

It was found that 3-amino-5-substituted amino-6-chloropyrazinoic acid esters could be synthesized by the reaction of an amine with a 3-amino-5,6-dichloro-pyrazinoic acid ester using conditions and solvents conventionally employed for reactions of this type. However, when ammonia was used in place of an amine, 3-amino-5,6-dichloropyrazinamide was formed preferentially and, if the reaction was forced by increasing the temperature, 3,5-diamino-6-chloropyrazinamide was produced. In no instance, however, was it possible to replace the 5-chloro by the amino without first forming the amide.

As the pyrazinoic acid ester is an important intermediate in the preparation of pyrazinoylguanidine and pyrazinamidoguanidine compounds, it was important to discover a method that would introduce an amino group in the 5-position of the pyrazine nucleus without simultaneously converting the alkoxycarbonyl group to a carbamoyl, as it was found that the 3,5-diamino-6-chloropyrazinoic esters are inaccessible or difficultly accessible by other synthetic routes.

Surprisingly it was found that the above difficulties could be overcome by conducting the reaction of 3-amino-5,6-dichloropyrazinoic acid ester with ammonia in the presence of dimethyl sulfoxide (DMSO), or other solvent of high dielectric constant such as other lower alkyl sulfoxides or sulfones or N,N-di-lower alkyl alkanamides, as dimethylformamide, diethylformamide, N,N-dimethylacetamide, N,N-diethylacetamide and the like. Under these special conditions the 5-chloro atom is preferentially replaced by the amino group and no recoverable amount of amide is produced. In the presence of these solvents, the reaction takes place under mild conditions, temperatures being in the range of from about 10° C. to about steam bath temperature or slightly higher. Dry ammonia gas is passed into a solution of the 3-amino-5,6-dichloropyrazinoic acid ester in DMSO or other solvents mentioned above, preferably with stirring and the reaction is completed within about thirty minutes although it can be carried on over a longer period of time to improve the yield if desired. The product readily separates from the reaction mixture by diluting with water.

The product obtained then can be converted to the corresponding pyrazinoylguanidine or pyrazinamido guanidine by the reaction of the 3,5-diamino-6-chloropyrazinoic acid ester with an unsubstituted or substituted guanidine or an aminoguanidine preferably under anhydrous conditions with or without a solvent at room temperature or mild heating, to form the corresponding 3,5-diamino-6-chloropyrazinoylguanidine or 3,5-diamino-6-chloropyrazinamidoguanidine. Each of these types of end product prepared from the novel 3,5-dimethyl-6-chloropyrazinoic acid ester of this invention possesses diuretic and natriuretic properties and are therefore useful in the treatment of edema, hypertension and other diseases known to be responsive to this therapy.

EXAMPLE 1.—METHYL 3,5-DIAMINO-6-CHLOROPYRAZINOATE

Step A: Preparation of methyl 3-amino-5,6-dichloropyrazinoate

Methyl 3-aminopyrazinoate (765 g., 5 moles) is suspended in 5 liters of dry benzene. While stirring under anhydrous conditions, sulfuryl chloride (1.99 liters, 3318 g., 24.58 moles) is added over a period of 30 minutes and stirring is continued for 1 hour. During this period, the temperature rises to about 50° C. and then begins to drop. The mixture is heated cautiously to reflux (60° C.), refluxed for 5 hours and then stirred over night at room temperature. The excess sulfuryl chloride is removed by distillation at atmospheric pressure (distillation is stopped when vapor temperature reaches 78° C.). The dark red mixture is chilled to 60° C. The crystals are removed by filtration, washed by displacement with cold (8° C.) benzene (two 100 ml. portions), then washed with petroleum ether (300 ml.) and dried in vacuo at room temperature, yielding 888 g. (80%) of methyl 3-amino-5,6-dichloropyrazinoate in the form of red crystals, M.P. 228–230° C. The crude product is dissolved in boiling acetonitrile (56 liters) and passed through a heated (70–80° C.) column of decolorizing charcoal (444 g.). The column is washed with hot acetonitrile (25 liters) the combined eluate concentrated in vacuo to about 6 liters and chilled to 5° C. The crystals that form are removed by filtration, washed three times with cold acetonitrile, and air dried to constant weight. The yield is 724 g. (82% recovery, 66% over-all) of methyl 3-amino-5,6-dichloropyrazinoate in the form of yellow crystals, M.P. 230–234° C. After additional recrystallizations from acetonitrile the product melts at 233–234° C.

Analysis calculated for $C_6H_5Cl_2N_3O_2$: C, 32.46; H, 2.27; N, 18.93; Cl, 31.94. Found: C, 32.83; H, 2.35; N, 19.12; Cl, 31.94.

Step B: Preparation of methyl 3,5-diamino-6-chloropyrazinoate

In a 2-liter, 3-necked flask fitted with a mechanical stirrer, thermometer and gas inlet tube is placed dry dimethyl sulfoxide (1 liter). Methyl 3-amino-5,6-dichloropyrazinoate (100 g., 0.45 mole) is added and the mixture stirred and heated at 65° C. on a steam bath until solution is effected. A stream of dry ammonia gas is admitted to the solution, with continuous stirring, over a period of 45 minutes while the temperature is maintained at 65–70° C. The solution is cooled to about 10° C. with continuous stirring and ammonia gas is admitted for an additional 1¼ hours. The yellow reaction mixture is poured, with stirring, into cold water (2 liters) and the light yellow solid that separates is removed by filtration and thoroughly washed with water, and dried in a vacuum desiccator, to give 82.5 g. (91%) of methyl 3,5-diamino-6-chloropyrazinoate, M.P. 210–212° C. Recrystallization from acetonitrile gives material melting at 212–213° C.

Analysis calculated for $C_6H_7ClN_4O_2$: C, 35.57; H, 3.48; N, 27.65. Found: C, 35.80; H, 3.38; N, 28.01.

EXAMPLE 2.—METHYL 3,5-DIAMINO-6-CHLOROPYRAZINOATE

Methyl 3-amino-5,6-dichloropyrazinoate (11.1 g., 0.05 mole) is suspended in dry dimethyl formamide (60 ml.)

and heated on the steam bath until a solution is obtained. The solution is stirred and while heating is continued a stream of dry ammonia gas is admitted below the surface for a period of 30 minutes. The reaction mixture then is poured into ice water (200 ml.) and a solid separates which is collected on a funnel and dried, yielding 7.8 g. (78%) of methyl 3,5-diamino-6-chloropyrazinoate, M.P. 208–212° C. The product after purification by recrystallization from acetonitrile melts at 212–213° C.

EXAMPLE 3.—METHYL 3,5-DIAMINO-6-CHLOROPYRAZINOATE

A mixture of methyl 3-amino-5,6-dichloropyrazinoate (11.1 g., 0.05 mole) and dimethyl sulfone (100 g.) is heated at 110° C. until a clear solution is obtained. This solution is stirred and heated at 110° C. while a stream of dry ammonia gas is admitted for a 30 minute period. The reaction mixture then is poured into 500 ml. of ice water. A solid separates which is collected on a funnel and dried yielding 7.2 g. (72%) of methyl 3,5 - diamino - 6 - chloropyrazinoate, M.P. 210–212° C. Following recrystallization from acetonitrile the product melts at 212–213° C.

While the above example describes the preparation of the methyl ester, other esters can be prepared by employing the ethyl, propyl or other lower alkyl ester of 3-aminopyrazinoic acid in place of the methyl 3-aminopyrazinoate employed in Example 1, Step A. Thus by following the procedures described in Example 1, Steps A and B, and employing, for example, the ethyl 3-aminopyrazinoate, propyl 3-aminopyrazinoate, amyl 3-aminopyrazinoate, there is obtained, respectively, the ethyl 3,5-diamino-6-chloropyrazinoate, propyl 3,5-diamino-6-chloropyrazinoate, amyl 3,5-diamino-6-chloropyrazinoate, or other lower alkyl 3,5-diamino-6-chloropyrazinoate.

While the invention has been illustrated by the preparation of certain specific compounds and certain specific reaction conditions, it is to be understood that the invention is not to be limited to those specific compounds nor to the specific reaction conditions but is to be understood to cover equivalent conditions and compounds which fall within the foregoing discussion and the appended claims.

What is claimed is:
1. Lower alkyl 3,5-diamino-6-chloropyrazinoate.
2. Methyl 3,5-diamino-6-chloropyrazinoate.
3. The process wherein lower alkyl 3-amino-5,6-dichloropyrazinoate is caused to react with ammonia in the presence of a solvent of high dielectric constant selected from lower alkyl sulfoxide, lower alkyl sulfone, lower formamide and N,N-lower alkyl acetamide to form lower alkyl 3,5-diamino-6-chloropyrazinoate.
4. A process as claimed in claim 3 wherein dimethyl sulfoxide is employed as solvent.
5. The process as claimed in claims 3–4 wherein the reaction mixture is maintained at a temperature between about 10° C. and about steam bath temperature.
6. The process as claimed in claims 3–5 wherein methyl 3-amino-5,6-dichloropyrazinoate is caused to react with ammonia to yield methyl 3,5-diamino-6-chloropyrazinoate.

No references cited.

NICHOLAS S. RIZZO, *Primary Examiner.*
HENRY R. JILES, *Examiner.*